United States Patent
Owens

[19]

[11] Patent Number: 6,155,362
[45] Date of Patent: Dec. 5, 2000

[54] DOLLY SYSTEM WITH A MOTORIZED ROLLING TRACK

[76] Inventor: David R. Owens, 955 Highpoint Dr., Annapolis, Md. 21401

[21] Appl. No.: 09/243,738

[22] Filed: Feb. 1, 1999

[51] Int. Cl.[7] .................................................. B62D 55/075
[52] U.S. Cl. ........................................ 180/9.22; 180/9.34
[58] Field of Search ........................... 180/8.2, 9.1, 9.22, 180/9.32, 9.34, 9.36; 280/5.2, 5.22, 47.27

[56] References Cited

U.S. PATENT DOCUMENTS

| | | | |
|---|---|---|---|
| 3,092,200 | 6/1963 | Chambers | 180/9.22 |
| 3,330,370 | 7/1967 | Morton | 180/9.22 |
| 3,362,496 | 1/1968 | Landry | 180/9.22 |
| 3,370,664 | 2/1968 | Caplan | 180/9.22 |
| 4,027,889 | 6/1977 | Krofchalk et al. | 280/5.22 |
| 4,033,421 | 7/1977 | Ikarimoto | 180/8.2 |
| 4,962,940 | 10/1990 | Cuschera | 280/5.22 |
| 5,996,767 | 12/1999 | Misawa | 280/5.32 |

*Primary Examiner*—Kevin Hurley

[57] ABSTRACT

A dolly system with a motorized rolling track is disclosed. The dolly system includes a dolly having two generally vertically extending side rails. An L-shaped support is provided at its lower end thereof and a cross brace is provided adjacent to its upper end. A pair of rotatable wheels are located adjacent to the L-shaped member. Two pair of rearwardly facing braces are provided on the support rails. One pair of facing braces is adjacent the upper end thereof and one pair is adjacent the lower end thereof. An upper rotatable support rod is supported by the upper braces. A lower rotatable support rod is supported by the braces with a plurality of parallel idler rollers therebetween rotatably supported by a central block. The axis of rotation of the idler rollers is parallel with the axis of the rods. Drive cylinders are mounted on the rods with an endless belt positioned over the cylinders for rotation therewith, the belt being movable in a path of travel rearwardly of the support rods. A drive motor and operating drive belts couple the drive motor and the support rods to rotate the support rods and hence the belts upon activation of the motor.

2 Claims, 2 Drawing Sheets

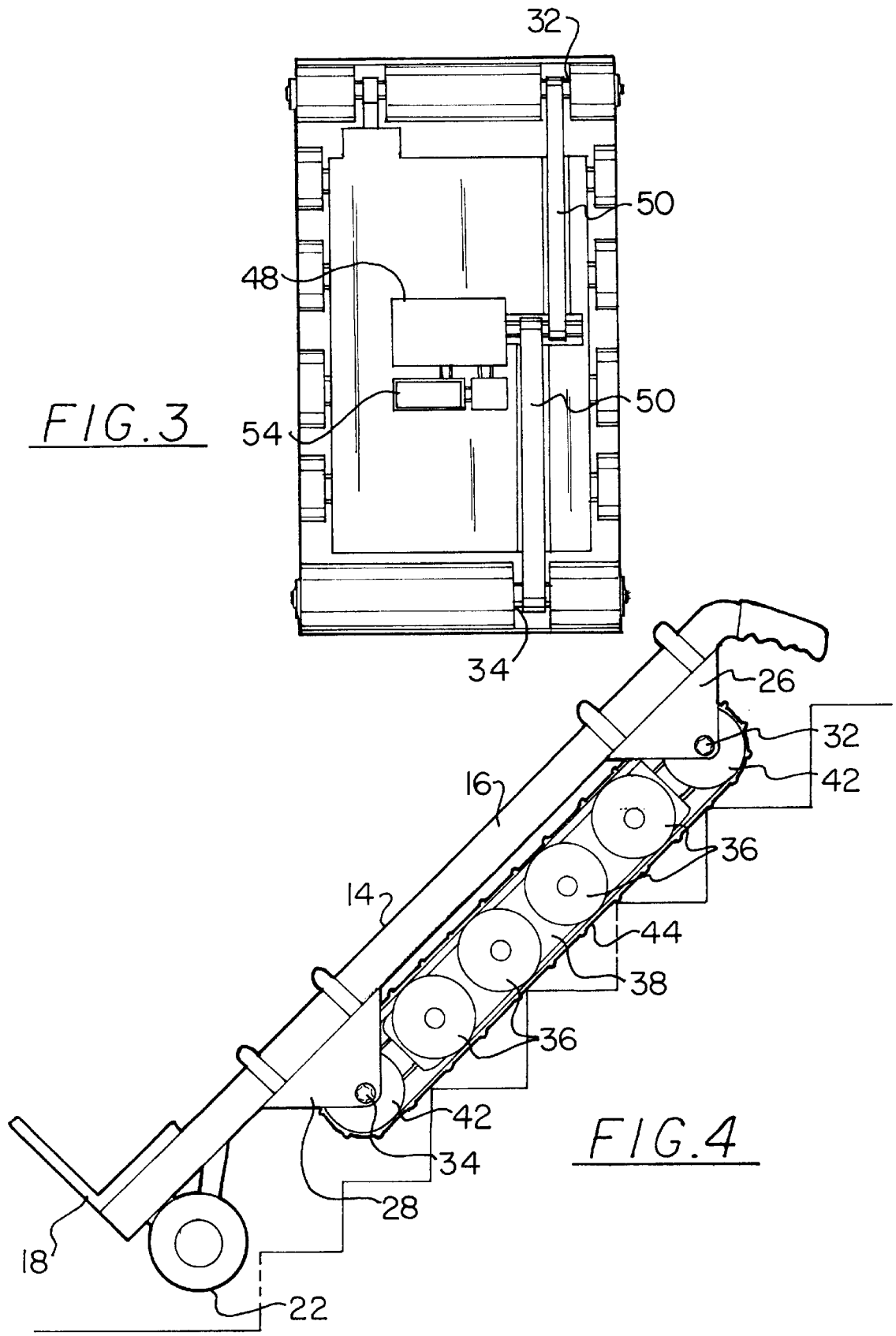

DOLLY SYSTEM WITH A MOTORIZED ROLLING TRACK

BACKGROUND OF THE INVENTION

1. Field of the Invention

The present invention relates to a dolly system with a motorized rolling track and more particularly pertains to allowing a dolly to crawl up stairways with its load.

2. Description of the Prior Art

The use of dollies of known designs and configurations is known in the prior art. More specifically, dollies of known designs and configurations heretofore devised and utilized for the purpose of moving heavy loads through various methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,264,082 to Fouchey, Jr. discloses a Stair Climbing Cart. U.S. Pat. No. 4,033,595 to Mauch discloses a Hand Truck. U.S. Pat. No. 3,362,496 to Landry discloses a Power Driven Dolly. U.S. Pat. No. 3,713,501 to Hurt discloses a Power Hand Truck. Lastly, U.S. Pat. No. 3,092,200 to L.C. Chambers discloses a Wheeled Conveyor. International Application Number PCT/SE85/00276.

While these devices fulfill their respective, particular objectives and requirements, the aforementioned patents do not describe a dolly system with a motorized rolling track as disclosed herein.

In this respect, the dolly system with a motorized rolling track according to the present invention substantially departs from the conventional concepts and designs of the prior art, and in doing so provides an apparatus primarily developed for the purpose of allowing a dolly to crawl up stairways with its load.

Therefore, it can be appreciated that there exists a continuing need for a new and improved dolly system with a motorized rolling track which can be used for allowing a dolly to crawl up stairways with its load. In this regard, the present invention substantially fulfills this need.

SUMMARY OF THE INVENTION

In view of the foregoing disadvantages inherent in the known types of dollies of known designs and configurations now present in the prior art, the present invention provides an improved dolly system with a motorized rolling track. As such, the general purpose of the present invention, which will be described subsequently in greater detail, is to provide a new and improved dolly system with a motorized rolling track and method which has all the advantages of the prior art and none of the disadvantages.

To attain this, the present invention essentially comprises a new and improved dolly system including a motorized rolling track formed along its backside to allow it to crawl up stairways with its load. The present invention includes a dolly having two generally vertically extending side rails and an L-shaped support at its lower end thereof and a cross brace adjacent to its upper end and with a pair of rotatable wheels adjacent to the L-shaped member; two pair of rearwardly facing braces on the support rails, one pair adjacent the upper end thereof and one pair adjacent the lower end thereof; an upper rotatable support rod supported by the upper braces and a lower rotatable support rod supported by the braces with a plurality of parallel idler rollers therebetween rotatably supported by a central block, the axis of rotation of the idler rollers being parallel with the axis of the rods; drive cylinders mounted on the rods with an endless belt positioned over the cylinders for rotation therewith, the belt being movable in a path of travel rearwardly of the support rods; a drive motor and operating drive belts coupling the drive motor and the support rods to rotate the support rods and hence the belts upon activation of the motor; control means including an on/off switch and an up button to drive the motor in a first upwardly direction and a down button to drive the motor in a second downwardly direction; and a remote control mechanism to operate the control means.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dolly system with a motorized rolling track which has all of the advantages of the prior art dollies of known designs and configurations and none of the disadvantages.

It is another object of the present invention to provide a new and improved dolly system with a motorized rolling track which may be easily and efficiently manufactured and marketed.

It is further object of the present invention to provide a new and improved dolly system with a motorized rolling track which is of durable and reliable constructions.

An even further object of the present invention is to provide a new and improved dolly system with a motorized rolling track which is susceptible of a low cost of manufacture with regard to both materials and labor, and which accordingly is then susceptible of low prices of sale to the consuming public, thereby making such dolly system with a motorized rolling track economically available to the buying public.

Even still another object of the present invention is to provide a dolly system with a motorized rolling track for allowing a dolly to crawl up stairways with its load.

Lastly, it is an object of the present invention to provide a new and improved dolly system with a motorized rolling track. The dolly system includes a dolly having two generally vertically extending side rails. An L-shaped support is provided at its lower end thereof and a cross brace is provided adjacent to its upper end. A pair of rotatable wheels are located adjacent to the L-shaped member. Two pair of rearwardly facing braces are provided on the support rails. One pair of facing braces is adjacent the upper end thereof and one pair is adjacent the lower end thereof. An upper rotatable support rod is supported by the upper braces. A lower rotatable support rod is supported by the braces with a plurality of parallel idler rollers therebetween rotatably supported by a central block. The axis of rotation of the idler rollers is parallel with the axis of the rods. Drive cylinders are mounted on the rods with an endless belt positioned over the cylinders for rotation therewith, the belt being movable in a path of travel rearwardly of the support rods. A drive motor and operating drive belts couple the drive motor and the support rods to rotate the support rods and hence the belts upon activation of the motor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top elevational view of the drive mechanism shown in FIG. 1 but with parts removed to show certain internal constructions thereof.

FIG. 4 is a side elevational view of the device shown in FIG. 1 during operation and use.

The same reference numerals refer to the same parts through the various Figures.

DESCRIPTION OF THE PREFERRED EMBODIMENT

Figure 1:
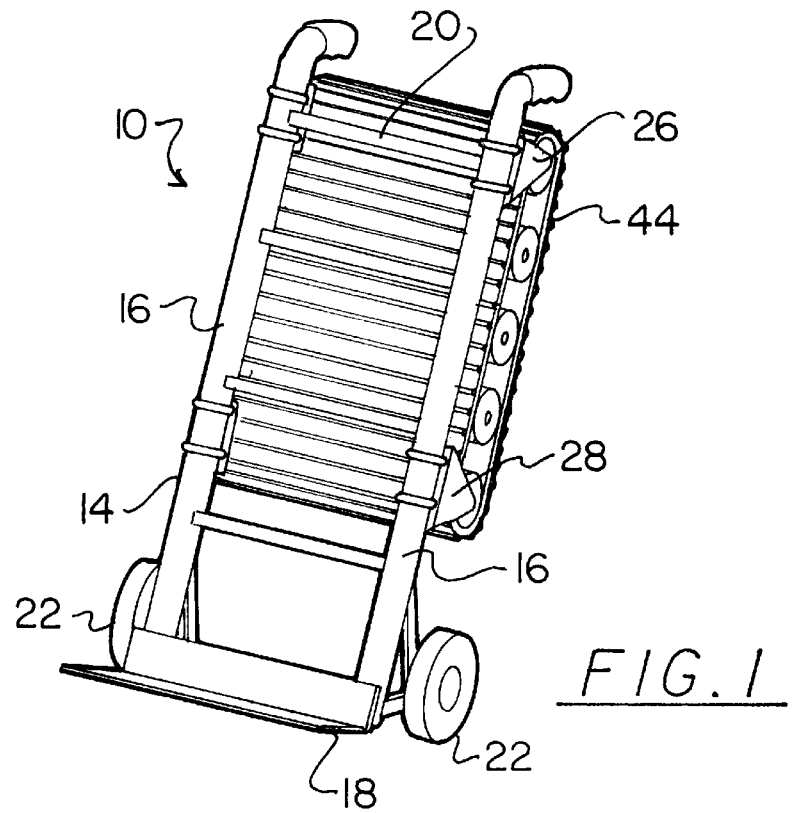
FIG. 1 is a perspective view of the preferred embodiment of the dolly system with a motorized rolling track constructed in accordance with the principles of the present invention.
Figure 2:
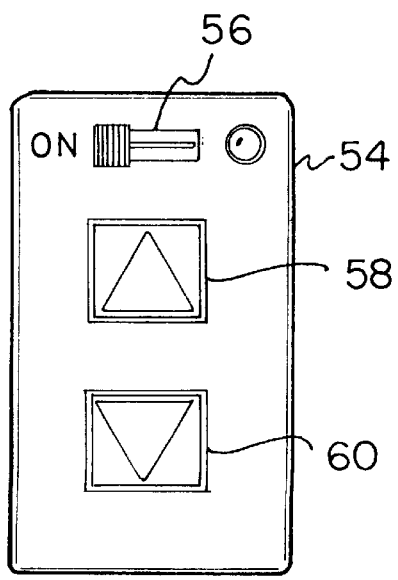
FIG. 2 is a remote control mechanism for controlling the operation of the device shown in FIG. 1.

With reference now to the drawings, and in particular to FIG. 1 thereof, the preferred embodiment of the new and improved dolly system with a motorized rolling track embodying the principles and concepts of the present invention and generally designated by the reference numeral 10 will be described.

The present invention, the dolly system with a motorized rolling track 10, is comprised of a plurality of components. Such components in their broadest context include a dolly, braces, support rods, drive cylinders, a drive motor and drive belts, control means and a remote control mechanism. Such components are individually configured and correlated with respect to each other so as to attain the desired objective.

The new and improved dolly system 10 as described herein includes a motorized rolling track formed along its backside to allow it to crawl up stairways with its load.

The system includes a dolly 14 having two generally vertically extending side rails 16 and an L-shaped support 18 at its lower end thereof. Also included is a cross brace 20 adjacent to its upper end and a pair of rotatable wheels 22 adjacent to the L-shaped member.

Next provided are two pair of rearwardly facing braces 26, 28 on the support rails. One pair is located adjacent the upper end thereof. The other pair is located adjacent the bottom thereof.

An upper rotatable support rod 32 is supported by the upper braces. A lower rotatable support rod 34 is supported by the lower braces. A plurality of parallel idler rollers 36 are located therebetween rotatably supported by a central block 38. The axis of rotation of the idler rollers is parallel with the axis of the rods.

Drive cylinders 42 are mounted on the rods with an endless belt 44 positioned over the cylinders for rotation therewith. The belt is movable in a path of travel rearwardly of the support rods.

Additionally provided is a drive motor 48 and operating drive belts 50 coupling the drive motor and the support rods to rotate the support rods and hence the belts upon activation of the motor.

Further provided are control means 54. The control means include an on/off switch 56 and an up button 58 to drive the motor in a first upwardly direction and a down button 60 to drive the motor in a second downwardly direction.

Lastly provided is a remote control mechanism to operate the control means.

The system of the present invention is a dolly with a motorized track along its back. This allows it to crawl up stairways with its load. The dolly of the system has the appearance of a conventional dolly. However, the rear of the dolly features a rolling track, like a conveyor belt. Inside this rubber track are the power and drive assembly, the motor, the battery, drive belt, rubber rollers, and a remote control receiver and switching mechanism.

The device is intended to have remote control operation, thus also requiring a hand-held remote control transmitting device. For use, the dolly would simply be leaned back against a stairway, and the drive mechanism activated. The present invention will reduce the back-breaking labor of transporting equipment of materials up stairways. Remote control operation allows the operator to stay out of the way.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A new and improved dolly system including a motorized rolling track formed along its backside to allow it to crawl up stairways with its load comprising, in combination:

a dolly having two generally vertically extending side rails and an L-shaped support at its lower end thereof and a cross brace adjacent to its upper end and with a pair of rotatable wheels adjacent to the L-shaped member;

two pair of rearwardly facing braces on the support rails, one pair adjacent the upper end thereof and one pair adjacent the lower end thereof;

an upper rotatable support rod supported by the upper braces and a lower rotatable support rod supported by the lower braces with a plurality of parallel idler rollers therebetween rotatably supported by a central block, the axis of rotation for the idler rollers being parallel with the axis of the rods;

drive cylinders mounted on the rods with an endless belt positioned over the cylinders for rotation therewith, the belt being movable in a path of travel rearwardly of the support rods;

a drive motor and operation drive belts coupling the drive motor and the support rods to rotate the support rods and hence the belts upon activation of the motor;

control means including an on/off switch and an up button to drive the motor in a first upwardly direction and a down button to drive the motor in a second downwardly direction; and a remote control mechanism to operate the control means.

2. A dolly system comprising:

a dolly having two generally vertically extending side rails and an L-shaped support at its lower end thereof and a rotatable wheels adjacent to the L-shape member;

two pairs of rearwardly facing braces on the support rails, one pair adjacent the upper end thereof and one pair adjacent the lower end thereof;

an upper rotatable support rod supported by the upper braces and a lower rotatable support rod supported by the lower braces with a plurality of parallel idler rollers therebetween rotatably supported by a central block, the axis of rotation of the idler rollers being parallel with the axis of the rods;

drive cylinders mounted on the rods with an endless belt positioned over the cylinders for rotation therewith, the belt being movable in a path of travel rearwardly of the support rods; and a drive motor and operating drive belts coupling the drive motor and the support rods to rotate the support rods and hence the belts upon activation of the motor.

* * * * *